United States Patent
Mahy et al.

(10) Patent No.: US 7,742,058 B2
(45) Date of Patent: Jun. 22, 2010

(54) METHOD FOR SELECTING A COLOR TRANSFORMATION

(75) Inventors: Marc Mahy, Wilsele (BE); Paul Delabastita, Antwerpen (BE)

(73) Assignee: Agfa Graphics NV, Mortsel (BE)

( * ) Notice: Subject to any disclaimer, the term of this patent is extended or adjusted under 35 U.S.C. 154(b) by 581 days.

(21) Appl. No.: 11/657,317

(22) Filed: Jan. 24, 2007

(65) Prior Publication Data
US 2008/0174608 A1 Jul. 24, 2008

(51) Int. Cl.
*G09G 5/02* (2006.01)

(52) U.S. Cl. .................. 345/590; 345/581; 345/589; 345/601; 345/602; 345/604; 345/644; 358/518

(58) Field of Classification Search .................. 345/644
See application file for complete search history.

(56) References Cited

U.S. PATENT DOCUMENTS

| 6,781,716 | B1 * | 8/2004 | Yoda ........................... 358/1.9 |
| 6,819,458 | B1 * | 11/2004 | Tanaka et al. ................ 358/518 |
| 6,995,865 | B1 * | 2/2006 | Motomura .................... 358/1.9 |
| 7,068,380 | B2 * | 6/2006 | Milton et al. ............... 358/1.13 |
| 7,417,772 | B2 * | 8/2008 | Chang ........................ 358/3.03 |
| 7,450,267 | B2 * | 11/2008 | Ito et al. ...................... 358/1.9 |

* cited by examiner

*Primary Examiner*—Antonio A Caschera
(74) *Attorney, Agent, or Firm*—Keating & Bennett, LLP (57) ABSTRACT

An output color profile, such as an ICC output profile, contains a look-up table to separate the color of a pixel, for example a CIELAB color, into a set of colorant values, for example CMYK colorants. In practice, most CMYK images have been separated using one of a limited set of standardized output profiles. The problem to be solved is guessing which one of these standardized output profiles has been used to separate a specific image. For this purpose the CMYK values of the image are analyzed. The analysis involves calculating a distance in the CMYK space between the CMYK values of an image, and the CMYK values produced by different output profiles. A profile is selected based on these distances, for example by selecting the profile yielding the shortest distance. This profile is then used for converting the CMYK colorant values of the image into CIELAB color values.

9 Claims, 3 Drawing Sheets

FIG. 5

METHOD FOR SELECTING A COLOR TRANSFORMATION

FIELD OF THE INVENTION

The invention relates to the field of color image reproduction. More specifically, the invention relates to the field of color management systems for obtaining faithful color reproduction of color images. Even more specifically, the invention deals with a method for determining which output color profile has been used to separate an image into colorant values.

BACKGROUND OF THE INVENTION

General Background

Faithful reproduction of color images on color printing devices relies on a color management system. Such a system transforms color values in an original document into colorant values for a printing system in such a way that the colors in the original document are faithfully rendered.

Most commercial color management systems are based on the specifications of the International Color Committee (ICC) for representing color transformations. The ICC has a website on http://www.color.org.

According to the ICC, a color transformation is stored in a "color profile".

A "source color profile" contains a transformation for color or colorant values that serve as input—e.g. RGB values produced by a digital camera or from a previous color transformation—to color values in device independent color space, such as for example CIELAB.

A "destination color profile" contains a transformation from color values in a device independent color space to a set of color or colorant values—e.g. representing amounts of cyan (C), magenta (M), yellow (Y) and black (K) ink—that serve as an output, for example to a printer or to a next color or colorant transformation.

The determination of a color profile involves a characterization step whereby the device dependent color or colorant values are related to calorimetrically measured color values of color patches of a characterization target.

A key component of the ICC specification is the use of a well-defined "profile connection space" (PCS). This standard color space is the interface which provides an unambiguous connection between a source and a destination profile. It is the virtual destination for source profiles and the virtual source for destination profiles. If the source and destination profiles are based on the same PCS definition, even though they are created independently, they can be paired arbitrarily at run time by the color management system (CMM) and will yield consistent and predictable color reproduction from original to reproduction.

A source and a destination profile can be concatenated into a color link. Such a link provides a direct transformation from color data that serves as input to color data that serves as output. For example, a color link may directly transform RGB data from an image capturing device into CMYK data of a printing device.

Digital Proofing System

A digital proofing system is used to verify the contents and various technical characteristics including color reproduction of a digital print master by simulating the printed results.

This simulation involves transforming the colorant values of the print master to colors in a profile connection space by means of a source profile and then transforming these colors from the profile connection space to the colorant space of the proofing device by means of a destination profile.

The destination profile for a proofing device is easily obtained by means of a characterization step of the proofing device.

The Problem

Ideally, a source profile for a digital proofing method matches the destination profile that was used for calculating the colorant values in the print master.

In practical cases, however, usually no information on the latter destination profile is available.

It my not be known, for example, if said latter destination profile was selected to transform colors from the profile connection space to colorants for commercial offset, newspaper offset, flexographic or gravure digital print masters.

Prior Art Solutions

A prior art solution relies on the assumption that in practice many print masters are created using only a limited set of standardized color destination profiles.

By analyzing the colorant values in a set of separations of a digital print master, and comparing these values with the values produced by a number of known standardized destination profiles, it is possible to guess which destination profile has been used to calculate the colorant values in the print master.

A first prior art method of analyzing the colorant values in a set of separations of a print master involves looking for the maximum value of the sum of the colorant values. Standardized CMYK destination profiles, for example, produce separations having a maximum value of the sum of colorant values that is typically in the range from 240% to 340%, for example 300% in a particular case.

A second prior art method of analyzing the colorant values in a set of separations is to look for the maximum amount of black colorant. Standardized destination profiles produce a maximum amount of black colorant in the black separation that ranges from 70% to 100%, for example 90% in a particular case.

While the above methods to guess what destination profile has been used to create a digital print master work fine in many cases, they are all but full proof.

One can, for example imagine an image that does not contain any dark colors at all. In that case neither the maximum value of the sum of the colorants, nor the maximum amount of black colorant in the separations can provide a useful and reliable indicator of what destination profile was used.

A need exists for a method that enables to determine what destination profile was used to create a set of separations for a print master and that is reliable for a wide range of images.

SUMMARY OF THE INVENTION

The above object is realized by a method and a system as disclosed in the independent and variously dependent claims.

According to the invention, a set of candidate destination profiles is evaluated to determine if one of them corresponds with the destination profile that was used to create a specific destination image.

A destination profile comprises entries defined in a source vector space, for example a CIELAB color space, whereby for each entry a destination vector in a destination space is available, for example a CMYK colorant vector. The destination vectors define a range of a destination profile.

In a preferred embodiment, the dimensionality of the destination space is larger than the dimensionality of the source space.

A destination image comprises pixels, whereby each pixel comprises a destination vector in the same destination space as in a destination profile.

A method according to the current invention works by calculating a distance between a destination vector corresponding to at least one pixel in the destination image, and at least a part of the range of different candidate destination profiles.

Preferably it is determined if a destination profile exists that minimizes this distance. In a preferred embodiment, this profile is then selected.

In a preferred embodiment, the evaluation of a candidate destination profile uses the distances between multiple vectors corresponding to multiple pixels in a destination image and destination vectors of a destination profile. These distances are preferably combined into an aggregate distance function that also takes account other elements. The one candidate destination profile is determined that yields the shortest aggregate distance.

In a very preferred embodiment, the distance between a vector corresponding to a pixel in a destination image, and a part of the range of a destination profile is calculated using the singular value decomposition algorithm.

In a preferred embodiment, the source space of a destination profile is an ICC profile connection space.

In a preferred embodiment, the destination space of a destination profile is a CMYK colorant space.

The method according to the current invention does not rely on a single parameter such as a maximal sum of colorant values in separations or a maximum value of the black colorant in black separation to guess what destination profile was used to create an image.

Instead, the method relies on a distance function in the destination space. As a result, the method does not suffer form the drawbacks of the prior art techniques.

For example, the method does not depend on the presence of dark colors in the destination image to produce reliable results.

Furthermore, because the selection of a destination profile preferably takes into account multiple pixels, the method is very robust, even in the presence of interpolation errors on the destination vectors of the pixels of the destination image.

TERMINOLOGY

Color and Color Space

The color of an object refers to the way that the electromagnetic spectrum that it reflects, transmits or radiates is perceived by the human visual system of an observer.

A color can be represented by a color vector comprising components of which the magnitudes correspond with the energy magnitudes of a set of primary colors that—when additively mixed—yield visually the same impression to said observer as said color.

It has been demonstrated that a vector having three components is sufficient to represent a color in a unique way to a standard observer. In that case the color space is three-dimensional.

The three components can correspond to a set of three real primaries, such as a red, green and blue primary, or a set of three virtual primaries such as the CIE XYZ primaries. A characteristic of the CIE XYZ set of primaries is that they correspond with the integrated responses as measured through a set of three spectral filters that are linear combinations of the receptor responses of the human visual system of a standard observer.

Another approach uses a transformation of the coordinates in said CIE XYZ primary system to yield a locally psychovisually uniform color space. This is the basis of the three-dimensional CIELAB and CIELUV color spaces.

More information on the subject of color spaces is found in the publication "Color Science: concepts and methods, quantitative data and formulae" (2nd ed.) by Wyszecki G. & Stiles W. S. published in 1982 Wiley (New York) or in the CIE publication 15:2004 on the subject of colorimetry, both herein incorporated in their entirety for background information only.

Color appearance models are designed to take into effect the observation that the psychovisual appearance of a color stimulus may be affected by the presence of other visual stimuli. An example of such a color appearance model is the CIECAM02 color space, which expresses colors in terms of three dimensions having a semantic interpretation such as lightness, hue and chroma.

Color spaces are also referred to as device independent color spaces.

Colorant, Substrate and Colorant Space

A colorant shall mean a substance that induces a color or modifies the hue of something else by absorbing, reflecting or emitting light. The absorption, reflection or emission can be spectrally flat, or it can be spectrally selective.

A colorant can be a conventional pigmented or dyed ink or colorant, but it can also be wax, a water repellent substance, an adhesive or a plastic. Usually a colorant is not a pure compound, but a complex mixture comprising several components such as dyes, pigments, surfactants, binders, fillers, solvents, water and dispersants, each component serving a specific function. The colorant could also be a material of which the viscosity or phase changes with temperature, such as wax. Specifically mentioned also are colorants that polymerize, for example under influence of electromagnetic radiation such as UV light. This process is called curing.

A colorant magnitude shall represent a magnitude to drive a pixel of an output device that effects a specific amount of light absorption, reflection or emission by a colorant for said pixel when output on said device.

A colorant magnitude can be represented on a scale from 0% to 100%, for example to represent a magnitude of said colorant that ranges from minimum absorption on a substrate to maximum absorption. A colorant magnitude can also be represented using an eight bit word on a scale from 0 to 255, for example corresponding with a range from minimum to maximum emission in the case of a display system. Other possibilities also exist, e.g. colorant magnitudes represented on a 1 bit, a 12 bit or a 16 bit scale. A colorant magnitude can be represented on a linear or a non-linear scale.

A colorant vector is a vector of which the components are colorant magnitudes. A colorant vector can be represented in a colorant space of which the dimensions correspond with the colorant magnitudes.

A substrate could be paper, but it could also be textile, a synthetic foil or a metal plate on which colorant is laid down by a an output device.

Pixel and Image

A pixel is a two-dimensional spatial unit with which a color or colorant vector is associated.

An image is a spatial two-dimensional arrangement of pixels. Within the scope of this document, an image shall also comprise a sequence of temporally related images, for example for rendering motion pictures or television images. Also comprised are compressed images, i.e. images on which signal processing techniques have been applied to reduce pixel and coding redundancies.

Specifically included are images that use an indexed color palette, whereby each pixel comprises an index to a color in said color palette.

Output Device

An output device shall mean a hardware device that is capable to render images. In this document, rendering and printing shall both refer to the process of rendering an image on an output device, whatever its nature. An output system is a system that comprises an output device, but typically also software and hardware peripherals to operate said device, such as printer drivers, color correction and digital halftoning software and the systems they run on. In this document, the rendering of color by an output device or system shall be referred to as a rendering process, or—in short—a process.

Output devices comprise display and printing devices. Examples of display devices comprise CRT's, LCD's, plasma and projection displays. Most of these devices can render both static and motion pictures. Examples of printing technologies comprise printers for photographic paper, electro-photographic printers, thermal transfer printers, ink jet printers, offset printers, gravure printers and flexographic printers.

An output device can be monochrome or color, depending on its capabilities to render monochrome or color images. A device that is capable to independently vary for each pixel the magnitude of N distinct colorants is said to have an N-dimensional colorant space, wherein each dimension corresponds with one of said colorants. Such a device is capable to print a pixel having an N-dimensional colorant vector.

Take for example an offset printing press. Most offset presses are operated using cyan (C), magenta (M), yellow (Y) and black (K) inking stations. The number of colorants and hence the dimensionality of the colorant space is four.

The colorant space that is associated with an output device is sometimes referred to as a device dependent color space, wherein said device refers to the output device.

The colorant gamut of an output device corresponds with all possible combinations of colorant magnitudes that said output device is capable to render.

In absence of any limitations on colorant combinations, the colorant gamut associated with a process having an N-dimensional colorant space is an N-dimensional cube. In most practical situations not all possible colorant combinations are acceptable for rendering. Such a limitation on combining different colorant magnitudes reduces the colorant gamut.

Output Device Model and Model Inversion

An output device model is a function that expresses what color vector results from printing a colorant vector on an output device.

According to the current invention, an output device model is preferably a continuous, analytical function.

An N-dimensional rendering process is characterized if:
its output device model is defined;
its colorant gamut is defined (specifically including colorant limitations).

The coefficients of an output device model are preferably characterized using a characterization target. Such a target consists of a number of patches of which the colorant vectors are specified. By printing said target, and measuring the color of the printed patches, a relation between colorant vectors and the resulting color vectors can be determined.

An example of an output device target is the IS12642 target (formerly called ANSI IT 8.7/3 target).

Preferably the colorant vectors corresponding to patches of a characterization target are combinations of a set of sampling points along the different dimensions in colorant space. By making all the possible combinations of said sampling points, an regular grid of points in colorant space is defined.

Before a characterization target is rendered by an output device, said output device is preferably first calibrated. Calibration involves for example normalizing for each colorant separately the relation between a colorant magnitude and the resulting color to a predefined standard. Other aspects of calibration may focus on other psychophysical characteristics such a dynamic range and/or neutral balance.

An output device model enables to predict in what color the rendering of a colorant vector results. In this document, model inversion shall refer to the process of inverting an output device model so that colorant vectors can be predicted that, when rendered, yield a given color vector.

An example of an output device model and a technique to invert said model is found in the article by Marc Mahy and Paul Delabastita, "Inversion of the Neugebauer Equations," Color Research and Application, Vol. 21, No 6, pp. 404-411, herein incorporated in its entirety for background information only.

A color image can comprise millions of pixels. For converting between the color and colorant vectors of these pixels, preferably a look up table in combination with an efficient interpolation algorithm is used, because this approach is computationally more efficient than an evaluation pixel-by-pixel of an output device model and/or model inversion.

In this document a forward look-up table preferably comprises colorant vectors as the entries and color vectors as data points. A forward look up table is populated by evaluating an output device model for its entries, optionally including a gamut mapping step and/or a color correction step for a specific rendering intent.

Similarly, an inverse look up table preferably comprises color vectors as the entries and colorant vectors as data points. An inverse look up table is populated by evaluating the inverse output device model, optionally including a gamut mapping step and/or a color correction step for a specific rendering intent.

Color Gamut of an Output Device

The color gamut of an output device is the range of the colors that results from printing the colorant gamut.

As mentioned before, the colorant gamut of an N-colorant process is limited by hyperplanes in the N-dimensional colorant space.

Destination Profile

A destination profile comprises entries defined in a source vector space whereby for each entry a destination vector in a destination space is available.

A destination profile is used to transform a source image into a destination image. The source image comprises pixels having vectors in a source vector space and the destination pixels having vectors in a destination space.

The source vector space is for example a color space, such as CIELAB.

The destination vector space is for example a colorant vector space, such as a CMYK colorant space.

A destination profile preferably comprises an inverse look-up table of a process. In that case the entries of the inverse look up table correspond with the entries of the destination profile and data points of the look up table with the destination vectors.

Optionally a destination profile may also comprise a forward look-up table. In that case the entries of the forward look-up table correspond with vectors in the destination vector space of the destination profile, and the data points of the forward look-up table correspond with vectors in the source space of the destination profile.

An example of a destination profile is an ICC output profile. Another example is a color link that transforms a color in the RGB color space of an image capturing device into a colorant vector in a CMYK destination space.

In one preferred embodiment, the source space of a destination profile is an ICC profile connection space.

For example, a destination profile may comprise an inverse look up table having CIELAB color vectors as entries and CMYK colorant vectors as data points.

The same destination profile may also comprise a forward look up table having CMYK colorant vectors as entries and CIELAB color vectors as data points.

The entries (L[i], a[j], b[k]) of the inverse look up table are preferably organized as an regular grid of points in the three dimensional color space corresponding to—for example— combinations of 33 CIE L* values with 33 CIE a* values and 33 CIE b* values.

Interpolation

For points that do not correspond with entries in a forward or inverse look up table interpolation can be used.

At least two forms of interpolation are available.

A first interpolation scheme uses N-linear interpolation, whereby N refers to the dimension of an entry of an interpolation table.

This scheme predicts an interpolated data point from the $2^N$ data points corresponding to the vertices of an N-dimensional cube to which the entry belongs. The well known bi-linear and tri-linear interpolation techniques for interpolating in two and three dimensional tables are examples of this technique.

Figure 1:
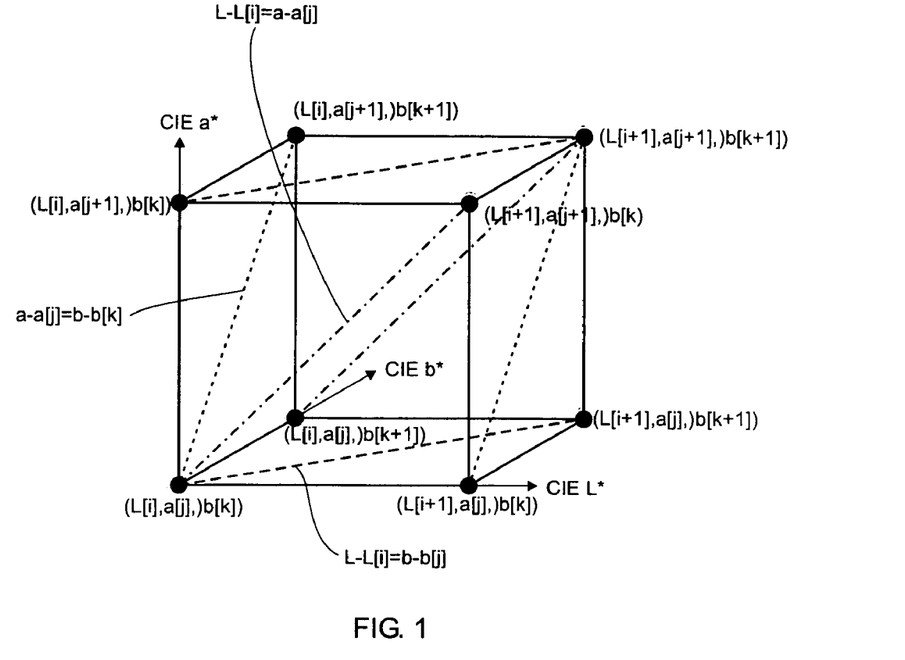
FIG. 1 shows a cubic cell in a source space. The cell is subdivided into six tetrahedrons by three diagonal planes.

A second interpolation technique is referred to as "tetrahedral interpolation" and will here be explained by means of FIG. 1 for the specific case of an inverse table having three-dimensional entries (L,a,b) and four-dimensional data points (C,M,Y,K).

The inverse table has entries that correspond with the combinations of:

$L[i], i \geq 1, i \leq imax;$ $a[j], j \geq 1, j \leq jmax;$ $b[k], k \geq 1, k \leq kmax;$ A tetrahedral interpolation of a color (L,a,b) in a three dimensional color space comprises the following steps:

In a first step a cube [(i;i+1], [j;j+1], [k;k+1]) is determined having vertices that enclose the color (L,a,b).

This is done by determining the indices (i,j,k) for which the following relations hold:

$L[i] \leq L \leq L[i+1]$ $a[j] \leq a \leq a[j+1]$ $b[k] \leq b \leq b[k+1]$

In a next step a tetrahedron in said cube is determined to which the color (L,a,b) belongs.

For this purpose and referring to FIG. 1, a cube is divided six tetrahedrons by three diagonal planes. The equations of these planes are:

$L-L[i]=a-a[j];$ $a-a[j]=b-b[k];$ $L-L[i]=b-b[k];$

Each of the 3 planes subdivides the cube into two half cubes. The three planes together divide the cube into six tetrahedrons shown in FIG. 2A to 2F. A point (L,a,b) lies on one or on the other side with regard to each of the three planes:

$L-L[i] \leq a-a[j]$; or $L-L[i] > a-a[j]$ $a-a[j] \leq b-b[k]$; or $a-a[j] > b-b[k];$ $L-L[i] \leq b-b[k]$; or $L-L[i] > b-b[k];$ Depending on its location with reference to the three planes, a point (L,a,b) belongs to one of the six tetrahedrons.

For example, it can be determined that the outcome of the above tests is:

$L-L[i] > a-a[j];$ $a-a[j] \leq b-b[k];$ $L-L[i] > b-b[k];$

Figure 2A:
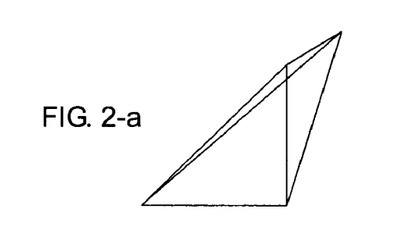
FIG. 2A to 2F show the six tetrahedrons the result from subdividing the cubic cell in FIG. 1 by three diagonal planes. These tetrahedrons form the basis of a tetrahedral interpolation scheme.
Figure 2B:
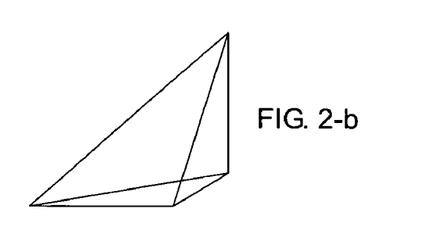
Figure 2C:
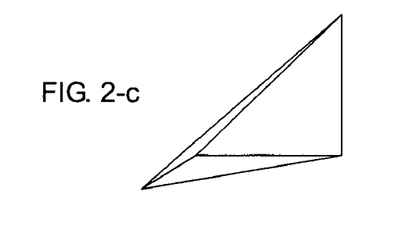
Figure 2D:
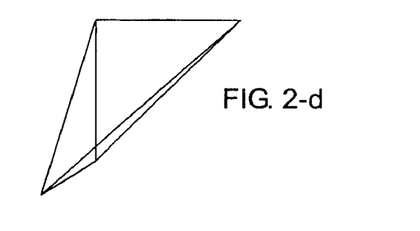
Figure 2E:
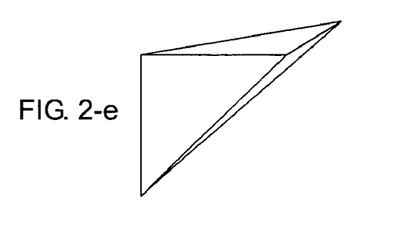
Figure 2F:
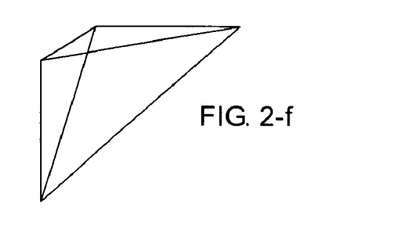
Figure 3:
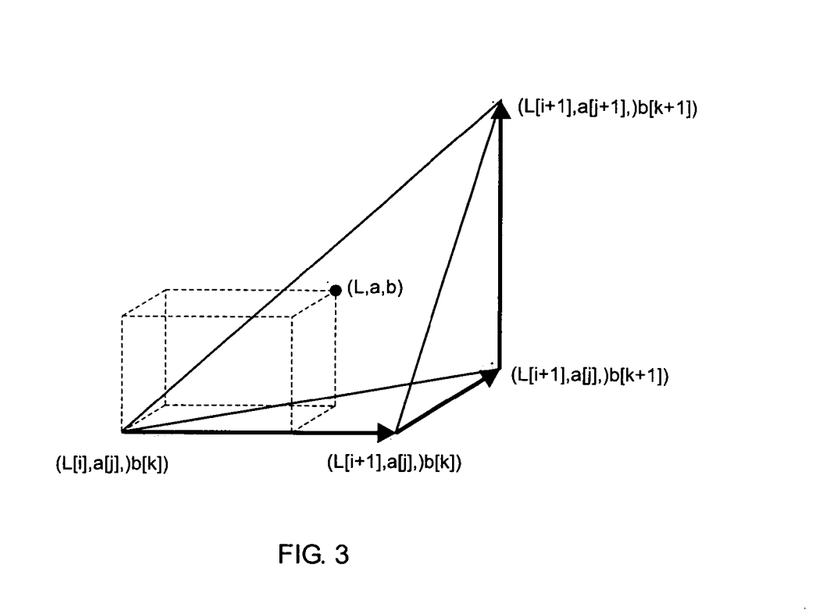
FIG. 3 illustrates tetrahedral interpolation in a tetrahedron shown in FIG. 2B

Such a point (L,a,b) would belong to a tetrahedron shown in FIG. 2B or in FIG. 3.

Having determined to which tetrahedron a point (L,a,b) belongs, the tetrahedral interpolation itself becomes straightforward; For a cyan colorant, for example the interpolated value C(L,a,b) is calculated from the cyan values that are stored in the look up table on points that correspond with the vertices of the selected tetrahedron. Specifically:

$C(L,a,b)=C(L[i],a[j],b[k])+W1*((C(L[i+1],a[j],b[k])-C(L[i],a[j],b[k]))+W3*((C(L[i+1],a[j],b[k+1])-C(L[i+1],a[j],b[k]))\ W2*((C(L[i+1],a[j+1],b[k+1])-C(L[i+1],a[j],b[k+1]))$ wherein:

W1=(L−L[i])/(L[i+1]−L[i])
W2=(a−a[j])/(a[j+1]−a[j])
W3=(b−b[k])/(b[k+1]−b[k])

The above equation can be written in more concise form by defining:

$C0=C(L[i],a[j],b[k])$ $C1=C(L[i+1],a[j],b[k])$ $C2=C(L[i+1],a[j+1],b[k])$ $C3=C(L[i+1],a[j+1],b[k])$

C0, C1, C2 and C3 correspond to the cyan values of the four vertices to which the point Lab belongs.

The interpolation formula for C becomes:

$$C=C0+(C1-C0)*w1+(C2-C1)*w3+(C3-C2)*w2$$

It is easy to see the above interpolation method corresponds with a piecewise linear interpolation along the ribs of the tetrahedron.

The same interpolation formula can also be used for magenta, yellow and black:

$$C=C0+(C1-C0)*w1+(C2-C1)*w3+(C3-C2)*w2$$

$$M=M0+(M1-M0)*w1+(M2-M1)*w3+(M3-M2)*w2$$

$$Y=Y0+(Y1-Y0)*w1+(Y2-Y1)*w3+(Y3-Y2)*w2$$

$$K=K0+(K1-K0)*w1+(K2-K1)*w3+(K3-K2)*w2$$

In a matrix form the interpolation can be written as:

$$\begin{bmatrix} C \\ M \\ Y \\ K \end{bmatrix} = \begin{bmatrix} b_0 \\ b_1 \\ b_2 \\ b_3 \end{bmatrix} + \begin{bmatrix} a_{00} & a_{01} & a_{02} \\ a_{10} & a_{11} & a_{12} \\ a_{20} & a_{21} & a_{22} \\ a_{30} & a_{30} & a_{32} \end{bmatrix} * \begin{bmatrix} L \\ a \\ b \end{bmatrix} \quad \text{Equation 1}$$

The determination of the coefficients $b_i$ and $a_{ij}$ from the previous equations is straightforward for a person skilled in the art and is not elaborated here. It is remarked that these coefficients are specific for a given tetrahedron to which the entry belongs and that they can be calculated ahead of time and stored in coefficient tables so that they are available at the time of the actual interpolation.

The Equation 1 can also be rewritten as:

$$\begin{bmatrix} C \\ M \\ Y \\ K \end{bmatrix} - \begin{bmatrix} b_0 \\ b_1 \\ b_2 \\ b_3 \end{bmatrix} = \begin{bmatrix} a_{00} & a_{01} & a_{02} \\ a_{10} & a_{11} & a_{12} \\ a_{20} & a_{21} & a_{22} \\ a_{30} & a_{30} & a_{32} \end{bmatrix} * \begin{bmatrix} L \\ a \\ b \end{bmatrix} \quad \text{Equation 2}$$

or in a short hand form:

$$\begin{bmatrix} C \\ M \\ Y \\ K \end{bmatrix} - \begin{bmatrix} b_0 \\ b_1 \\ b_2 \\ b_3 \end{bmatrix} = A * \begin{bmatrix} L \\ a \\ b \end{bmatrix} \quad \text{Equation 3}$$

The above equation represents a linear mapping of a three-dimensional source vector space onto its range in a four-dimensional destination vector space.

In summary, the tetrahedral interpolation to obtain a destination vector for a given source vector can be performed by:

1) determining to which tetrahedron a three-dimensional source vector belongs using a number of comparisons;
2) using a linear transformation [A] to transform the three-dimensional source vector into a four-dimensional destination vector.

DETAILED DESCRIPTION OF THE PREFERRED EMBODIMENTS

First the technical problem is shortly restated here.

Given a destination image having pixels in a destination space and given a set of candidate destination profiles comprising for example an inverse lookup table and optionally a forward look up table.

The destination space of the destination profile and the destination image are the same, for example a CMYK colorant space.

A destination profile has been used to generate the destination image from a source image. The source image is not available. It is not known what destination profile was used.

The problem that is to be solved is to find if one of the candidate destination profiles was used to transform the source image into the destination image—and if so—which one.

First Embodiment

Figure 5:
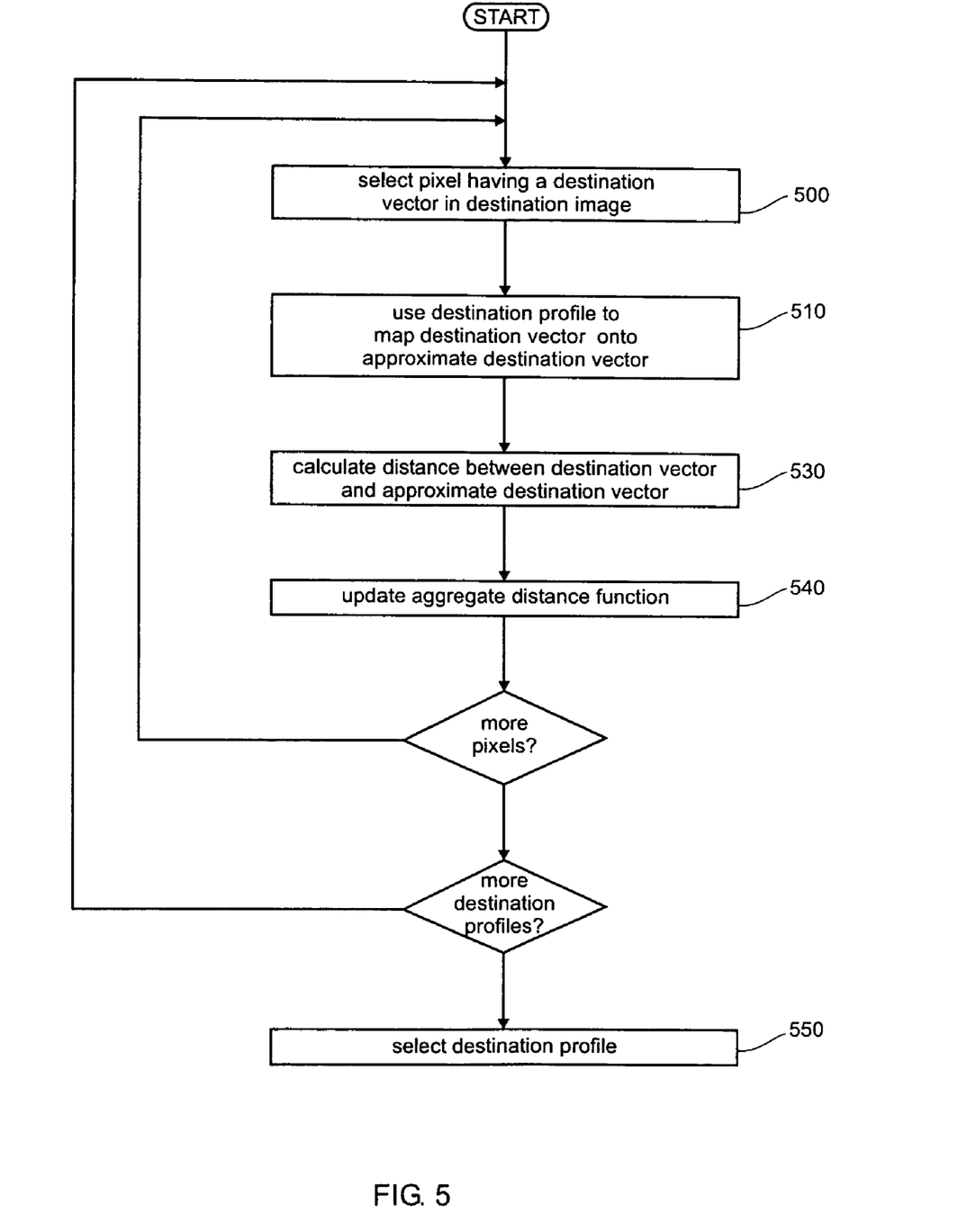
FIG. 5 shows the steps of a method according to a preferred embodiment of the current invention.

A first but not preferred embodiment works as follows and is explained by means of FIG. 5.

This first embodiment assumes that a destination profile also comprises a forward look up table (which is not always the case).

In a first step (500), a pixel of the destination image having a destination vector (c,m,y,k) is selected.

In a second step (510) this destination vector (c,m,y,k) is transformed into a source vector (L,a,b) using a forward look up table of a candidate destination profile. This is achieved using one of the known interpolation techniques such as N-dimensional interpolation or tetrahedral interpolation.

In the same second step (510) the source vector (L,a,b) is transformed back into an approximate destination vector (c', m',y',k') using the inverse look up table of the same candidate destination color profile. This is similarly achieved using one of the known interpolation techniques such as the three-dimensional interpolation or tetrahedral interpolation.

A distance D is next calculated (530) between the vectors (c,m,y,k) and (c',m',y',k') in the destination space.

The distance value D can for example be the Euclidian distance in the destination space:

$$D=\sqrt{(c-c')^2+(m-m')^2+(y-y')^2+(k-k')^2} \quad \text{Equation 4}$$

This distance D gives an indication if the candidate destination profile was used to calculate the destination image. Indeed, assuming that the forward and inverse look-up tables correspond with mutually inverse transformations, assuming that interpolation error is negligible, and assuming that a candidate destination profile was indeed the one that was used to calculate the destination image, the distance D will be zero or very small.

Preferably a distance D[r] is calculated for a representative set of rmax randomly selected pixels in the destination image. The value of rmax is for example between 50 and 100. These distance values are then combined during subsequent steps (540) into an aggregate distance function value AD that has a specific value for a given candidate destination profile. An example of an aggregate distance function is for example:

$$AD = \sum_{r=1}^{r=r\max} D[r] \quad \text{Equation 5}$$

The above steps are repeated for a number of candidate destination profiles.

If a destination profile is found (550) that yields an aggregate distance function value that is significantly smaller, for example less than 20% of the smallest aggregate distance of all the other candidate destination profiles, it can be assumed that this destination profile was the one that was used to calculate the destination image.

Refinements of the First Embodiment

The distance values D for a set of pixels in given destination image and a given candidate destination profile form a distribution. More reliable results are obtained if these values D[r][s] that correspond with the smallest and highest values of the distribution are not included in the calculation of the aggregate distance function. For example the 5% smallest and 5% highest values are rejected.

A further improvement is obtained by making an additional check to see if the original destination vector (c,m,y,k) and the approximate destination vector (c',m',y',k',) fall within the same tetrahedron in the destination space as defined by the forward look up table. If this is indeed the case, the distance between these two vectors is included in the aggregate distance function. If this is not the case, the distance between the two vectors is not included. For the purpose of this check, the volume of a tetrahedron is preferably artificially increased, for example 1% along each of its four dimensions.

A variation of the above improvement is to do a similar check but in the source space. For that purpose, both the original destination vector (c,m,y,k) and the approximate destination vector (c',m',y',k') are transformed into corresponding source vectors (L,a,b) and (L',a',b') and it is checked whether these two source vectors belong to the same tetrahedron as determined by the inverse look up table of the profile.

For the purpose of "normalizing" the distance function D, it is advantageous to use a weighted distance function using, for example weights $w_c$, $w_m$, $w_y$ and $w_k$. The weights can be profile specific, and—within a give profile—they can also be tetrahedron specific.

$$D = \sqrt{\frac{(c-c')^2}{w_c^2} + \frac{(m-m')^2}{w_m^2} + \frac{(y-y')^2}{w_y^2} + \frac{(k-k')^2}{w_k^2}} \quad \text{Equation 6}$$

These weights can be used to accommodate for the fact that certain profiles "naturally" result in a larger interpolation error when interpolating in forward or inverse look up tables than other profiles, for example because the transformations they reflect are less linear. Not compensating for this effect could lead to a wrong conclusion when selecting a candidate profile.

The weights can also accommodate for the fact that certain tetrahedrons are larger than other tetrahedrons and therefore "naturally" lead to larger interpolation error.

A first method to obtain weights for a given candidate profile is to calculate upfront the average values of the differences between c and c', between m and m', between y and y' and between k and k' for a set of pixels of a reference image, and to use these values as weights. The test image can be the destination image. If a set of rmax pixels is used in said image, the weights $w_c$, $w_m$, $w_y$, and $w_k$ for a candidate profile are for example:

$$w_c = \sum_{r=1}^{r=r\max} \frac{(c-c')}{r\max} \quad \text{Equation 7}$$

$$w_m = \sum_{r=1}^{r=r\max} \frac{(m-m')}{r\max}$$

$$w_y = \sum_{r=1}^{r=r\max} \frac{(y-y')}{r\max}$$

$$w_k = \sum_{r=1}^{r=r\max} \frac{(k-k')}{r\max}$$

A second method to obtain weights further refines the previous method by providing weights that are specific for each tetrahedron. By scaling the previously obtained weights by a factor that is proportional to the difference between the minimum and maximum value of a given component in a tetrahedron, the effect of the tetrahedron size on the interpolation error can be compensated for.

Specifically, for a given tetrahedron TETRAHEDRON[q] having minimum values $c_{min}$, $m_{min}$, $y_{min}$ and $k_{min}$, and having maximum values $c_{max}$, $m_{max}$, $y_{max}$ and $k_{max}$, the weights $w_c[s][q]$, $w_m[s][q]$, $w_y[s][q]$, and $w_k[s][q]$ would be:

$$w_c[q] = \sum_{r=1}^{r=r\max} \frac{(c-c')}{r\max} * (c_{\max} - c_{\min}) \quad \text{Equation 8}$$

$$w_m[q] = \sum_{r=1}^{r=r\max} \frac{(m-m')}{r\max} * (m_{\max} - m_{\min})$$

$$w_y[q] = \sum_{r=1}^{r=r\max} \frac{(y-y')}{r\max} * (y_{\max} - y_{\min})$$

$$w_k[q] = \sum_{r=1}^{r=r\max} \frac{(k-k')}{r\max} * (k_{\max} - k_{\min})$$

Problem with First Embodiment

While the above embodiment is conceptually simple and elegant, it is not always reliable for a number of reasons.

A first reason for this is that a destination profile usually, but not necessarily comprises a forward look-up table. If such a forward look up table is not available, the above method can not be used.

A second reason is that the above method relies on the assumption that interpolating in forward and inverse look up yields inverse results for producing small differences between an original colorant vector and an approximate colorant vector. This, however, is generally not the case.

A first explanation for this is interpolation error. The grid points in the destination space of a forward look up table do not map on grid points in the source space of an inverse look up table and vice versa.

For example, a colorant vector representing a 0% cyan 0% magenta 100% yellow and 0% black corresponds with a grid point of a forward look up table. When this vector is transformed into a color vector, it is most unlikely that this color vector will correspond with a grid point of the inverse look up table. Hence, when this color vector is transformed back into a colorant vector using interpolation in the inverse look up table, it will be subject to interpolation error and the original amounts of colorant will not be exactly retrieved.

A second explanation is that the transformations themselves that are used to calculate a forward and an inverse table are not necessarily each other inverses.

For example, the transformation used for a forward look up table may take a calorimetric approach, i.e. it may be designed to map a colorant vector on the exact color vector that an output device produces. The transformation used for an inverse look up table, on the other hand, may take a perceptual approach including a color gamut mapping step. Such a color gamut mapping step maps colors that are outside the color gamut in or onto the color gamut of an output device. However, to preserve color gradations that involve both colors that are inside and outside the gamut, a gamut mapping step typically also shifts colors that are inside the color gamut. Such colors are not calorimetrically rendered but in a way that preserves smooth gradations. As a result, the transformations of a forward table having a colorimetric intent and an inverse table having a perceptual intent will not be each other inverse.

Second Embodiment—Basic Principle

A second embodiment overcomes the limitations of the first embodiment.

In the previous embodiment, a forward look-up table was used to first obtain a source vector (L,a,b) corresponding with a destination vector (c,m,y,k) in a destination image. This source vector was then used to obtain an approximate destination vector (c',m',y',k') using the inverse look-up table.

In the current and preferred embodiment, only the inverse look-up table is used. This is less obvious than it first seems, as will be clear after reading of the remaining of this document. For the rest, the second and preferred embodiment uses the same steps as the first embodiment, including the refinements.

The Equation 1, which is derived for a specific tetrahedron cell in an inverse look-up table, predicts a four-dimensional destination vector (c,m,y,k) from a three-dimensional source vector (L,a,b).

In geometric terms, this transformation linearly maps a three-dimensional source vector space into a four-dimensional destination vector space.

Doing the opposite however—i.e. linearly transforming a four-dimensional vector space into a three dimensional vector space—is not possible without at least involving the truncation of a dimension.

In mathematical terms, this observation translates into the fact that it is not possible to simply invert the linear relationship in Equation 2 to get a linear expression that predicts a source vector from a destination vector, because the matrix A has more rows than columns and therefore cannot be inverted.

Nevertheless it has been found that it is possible to use the Equation 2 to obtain an approximate linear mapping of the four-dimensional destination space onto a range in the three-dimensional source space. This mapping involves a truncation of the number of dimensions from four to three.

According to the second and preferred embodiment of the current invention, a four dimensional destination vector is first transformed so that it is represented in an intermediate four dimensional orthogonal vector base, whereby the three of the four base vectors correspond with the three principal component vectors of the linear transformation from the three-dimensional source to the four-dimensional destination space. For this purpose the singular value algorithm can be used. The coordinate corresponding with a fourth orthogonal base vector is set to zero, which effectively truncates the four-dimensional vector to a three-dimensional vector. In a next step, the truncated vector is linearly transformed back into an approximate destination vector expressed in the canonical base of the destination vector space.

The difference between a destination vector and an approximate destination vector is further processed as in the first embodiment.

Figure 4:
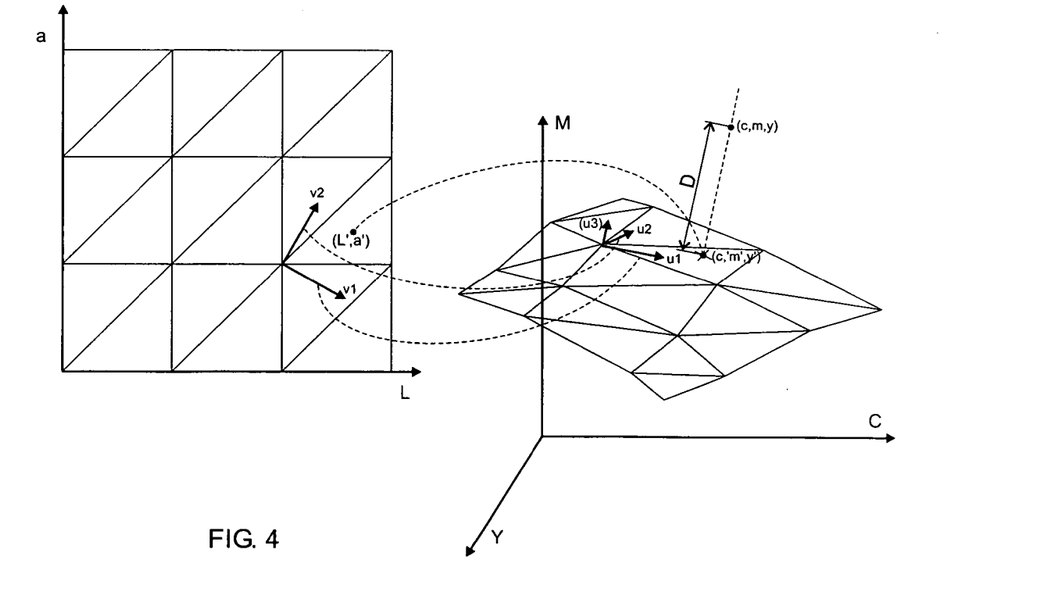
FIG. 4 illustrates a preferred embodiment of the current invention, whereby the source space is two-dimensional and whereby the destination space is three-dimensional.

The invention can also be explained by means of FIG. 4, in which a destination space (C,M,Y) has three dimensions and a source space (L,a) two dimensions.

A destination vector (c,m,y) is first represented in an intermediate orthogonal two-dimensional vector space having two orthonormal base vectors u1 and u2. These base vectors correspond with the two principal component vectors of the linear transformation from the two-dimensional source space (L,a) to the three-dimensional destination space (C,M,Y). By expressing the destination vector (c,m,y) as a function of the two principal component base vectors u1, u2 and setting a third coordinate to zero, it is effectively projected along the direction of a third orthogonal vector u3 onto an approximate destination vector (c',m',y'). This approximate destination vector linearly maps onto an approximate source vector (L', a').

The mathematical development of the above described technique makes use of "pseudo matrix inversion" (sometimes called "generalized matrix inversion or "Moore-Penrose matrix inversion") to inverse a linear mapping from a source vector space having a first dimension onto a destination vector space having a second dimension that is higher than the source vector space.

The detailed proof of theory and the properties of the pseudo inversion of a matrix are beyond the scope of this application. It has been shown in the art, however, that the method of using pseudo inversion of a matrix on a vector (C,M,Y,K) in a destination space produces an approximate solution for a vector (L',a',b') that is optimal in terms of least mean square.

Important properties of the pseudo-inverse of a matrix in the context of this patent application are:
1) $A*A^{\perp}*A=A$ (the definition of a pseudo inversion);
2) $(A^T)^{\perp}=(A^{\perp})^T$;
3) if A is a square nonsingular matrix, then: $A^{\perp}=A^{-1}$;
4) if A and B are such that the product of A*B is defined and either A or B is an orthogonal (or unitary) matrix then: $(A*B)^{\perp}=B^{\perp}*A^{\perp}$;

More information on this subject is found in the article "On the reciprocal of the general algebraic matrix" by E. H. Moore, published in the Bulletin of the American Mathematical Society 26, 394-395 (1920) or in the article "A generalized inverse for matrices" by Roger Penrose in the Proceedings of the Cambridge Philosophical Society 51, 404-413 (1955), both herein incorporated in their entirety for background information only. Another source of information on the same subject is also found in a scientific encyclopedia, such as for example Wikipedia.

According to a linear algebra theorem, the proof of which is beyond the scope of this patent application:

any matrix A having M row and N columns, whereby M>=N can be written as the product of
- an M×M matrix U, whereby the matrix U comprises a set of M orthonormal base vectors in its columns,
- a pseudo-diagonal M×N matrix W with positive or zero elements (the "singular values"), and
- the transpose of an orthonormal N×N matrix V, whereby the matrix V comprises a set of orthonormal base vectors in its columns.

In the current case, the matrix A would be the matrix that is used for tetrahedral interpolation in Equation 1 and that provides a linear mapping of a vector in a three-dimensional source space onto its range in a four-dimensional destination space.

The above theorem can be mathematically written as:

$$\begin{bmatrix} a_{00} & a_{01} & a_{02} \\ a_{10} & a_{11} & a_{12} \\ a_{20} & a_{21} & a_{22} \\ a_{30} & a_{31} & a_{32} \end{bmatrix} = \begin{bmatrix} u_{00} & u_{01} & u_{02} & u_{03} \\ u_{10} & u_{11} & u_{12} & u_{13} \\ u_{20} & u_{21} & u_{22} & u_{23} \\ u_{30} & u_{31} & u_{32} & u_{33} \end{bmatrix} * \begin{bmatrix} w_{00} & 0 & 0 \\ 0 & w_{11} & 0 \\ 0 & 0 & w_{22} \\ 0 & 0 & 0 \end{bmatrix} * \begin{bmatrix} v_{00} & v_{01} & v_{02} \\ v_{10} & v_{11} & v_{12} \\ v_{20} & v_{21} & v_{22} \end{bmatrix}^T \quad \text{Equation 9}$$

Or in a short hand form:

$$A = U * \begin{bmatrix} w_{11} & 0 & 0 \\ 0 & w_{22} & 0 \\ 0 & 0 & w_{33} \\ 0 & 0 & 0 \end{bmatrix} * V^T \quad \text{Equation 10}$$

This "decomposition" of a matrix [A] in three matrices has a geometrical interpretation in that transforming a three-dimensional source vector (L,a,b) into a four-dimensional destination vector (c,m,y,k) by means of a matrix A has the same effect as a sequence of the following three operations:

1) applying a coordinate transformation on a source vector (L,a,b) so that the transformed vector is expressed as a function of a set of three orthonormal base vectors; these three base vectors correspond with the row elements of the matrix V and are selected so that they linearly map onto the three "principal components" of the linear transformation from the three-dimensional source to the four-dimensional destination space;

2) rescaling the magnitude of the coordinates of the vector that results from the previous operation using the matrix W; during this rescaling, a fourth component is added to the three-dimensional vector so that it effectively becomes a four-dimensional vector.

3) applying a coordinate transformation on the result of the previous step so that the transformed vector is expressed in the canonical base of the four-dimensional destination space.

According to the above theorem, the four columns of the U matrix form an orthonormal set of four vectors in the destination space:

$$U^T * U = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad \text{Equation 11}$$

According to the same theorem, also the three row vectors of the V matrix form an orthonormal set of three vectors in the Lab space:

$$V * V^T = V^T * V = \begin{bmatrix} 1 & 0 & 0 \\ 0 & 1 & 0 \\ 0 & 0 & 1 \end{bmatrix} \quad \text{Equation 12}$$

The Equation 11 and the Equation 12 effectively mean that the transpose of a matrix U or a matrix V is equal to its inverse and vice versa:

$$U^T = U^{-1} \quad \text{Equation 13}$$

$$V^T = V^{-1} \quad \text{Equation 14}$$

The coefficients of the matrices U, V and W are preferably obtained by means of the "singular value decomposition algorithm", which is—for example—explained in the book Numerical Recipes in C++ by William H. Press, Saul A. Teukolsky, William Vetterling and Brian Flannery, published by Cambridge University Press, herein incorporated in its entirety for background information only.

Using the above theorems and properties, the technique of pseudo-inversion of a matrix [A] can be mathematically worked out as follows:

Pseudo-inversion of Equation 3 yields:

$$\begin{bmatrix} L' \\ a' \\ b' \end{bmatrix} = A^\perp * \left( \begin{bmatrix} C \\ M \\ Y \\ K \end{bmatrix} - \begin{bmatrix} b_0 \\ b_1 \\ b_2 \\ b_3 \end{bmatrix} \right) \quad \text{Equation 15}$$

wherein the symbol "⊥" refers to the pseudo inverse matrix operation on the matrix A and wherein (L',a',b') refer to an approximate color vector.

By combining Equation 15 and Equation 10 we get:

$$\begin{bmatrix} L' \\ a' \\ b' \end{bmatrix} = \left( U * \begin{bmatrix} w_{00} & 0 & 0 \\ 0 & w_{11} & 0 \\ 0 & 0 & w_{22} \\ 0 & 0 & 0 \end{bmatrix} * V^T \right)^\perp * \left( \begin{bmatrix} C \\ M \\ Y \\ K \end{bmatrix} - \begin{bmatrix} b_0 \\ b_1 \\ b_2 \\ b_3 \end{bmatrix} \right) \quad \text{Equation 16}$$

working Equation 16 out, making use of the properties (3) and (4) of the pseudo matrix inversion and of the fact that U and V are orthonormal matrices (Equation 13 and Equation 14) yields:

$$\begin{bmatrix} L' \\ a' \\ b' \end{bmatrix} = V * \begin{bmatrix} w_{00} & 0 & 0 \\ 0 & w_{11} & 0 \\ 0 & 0 & w_{22} \\ 0 & 0 & 0 \end{bmatrix}^\perp * U^T * \left( \begin{bmatrix} C \\ M \\ Y \\ K \end{bmatrix} - \begin{bmatrix} b_0 \\ b_1 \\ b_2 \\ b_3 \end{bmatrix} \right) \quad \text{Equation 17}$$

$$\begin{bmatrix} L' \\ a' \\ b' \end{bmatrix} = V * \begin{bmatrix} 1/w_{00} & 0 & 0 & 0 \\ 0 & 1/w_{22} & 0 & 0 \\ 0 & 0 & 1/w_{33} & 0 \end{bmatrix} * U^T * \left( \begin{bmatrix} C \\ M \\ Y \\ K \end{bmatrix} - \begin{bmatrix} b_0 \\ b_1 \\ b_2 \\ b_3 \end{bmatrix} \right) \quad \text{Equation 18}$$

The Equation 18 enables to calculate an approximate source vector (L',a',b') from a destination vector (C,M,Y,K) vector.

Similar as in the method according to the first embodiment, the approximate source vector (L',a',b') is now linearly mapped again onto an approximate destination vector (C',M', Y',K') using Equation 3:

$$\begin{bmatrix} C' \\ M' \\ Y' \\ K' \end{bmatrix} - \begin{bmatrix} b_0 \\ b_1 \\ b_2 \\ b_3 \end{bmatrix} = A * \begin{bmatrix} L' \\ a' \\ b' \end{bmatrix} \quad \text{Equation 19}$$

Substituting Equation 10 in Equation 19 yields:

$$\begin{bmatrix} C' \\ M' \\ Y' \\ K' \end{bmatrix} - \begin{bmatrix} b_0 \\ b_1 \\ b_2 \\ b_3 \end{bmatrix} = U * \begin{bmatrix} w_{00} & 0 & 0 \\ 0 & w_{11} & 0 \\ 0 & 0 & w_{22} \\ 0 & 0 & 0 \end{bmatrix} * V^T * \begin{bmatrix} L' \\ a' \\ b' \end{bmatrix} \quad \text{Equation 20}$$

Substituting Equation 18 in Equation 20 yields:

$$\begin{bmatrix} C' \\ M' \\ Y' \\ K' \end{bmatrix} - \begin{bmatrix} b_0 \\ b_1 \\ b_2 \\ b_3 \end{bmatrix} = U * \begin{bmatrix} w_{00} & 0 & 0 \\ 0 & w_{11} & 0 \\ 0 & 0 & w_{22} \\ 0 & 0 & 0 \end{bmatrix} * V^T *$$
$$V * \begin{bmatrix} 1/w_{00} & 0 & 0 & 0 \\ 0 & 1/w_{22} & 0 & 0 \\ 0 & 0 & 1/w_{33} & 0 \end{bmatrix} * U^T * \left( \begin{bmatrix} C \\ M \\ Y \\ K \end{bmatrix} - \begin{bmatrix} b_0 \\ b_1 \\ b_2 \\ b_3 \end{bmatrix} \right) \quad \text{Equation 21}$$

Working out Equation 21 yields:

$$\begin{bmatrix} C' \\ M' \\ Y' \\ K' \end{bmatrix} - \begin{bmatrix} b_0 \\ b_1 \\ b_2 \\ b_3 \end{bmatrix} = U * \begin{bmatrix} 1 & 0 & 0 & 0 \\ 0 & 1 & 0 & 0 \\ 0 & 0 & 1 & 0 \\ 0 & 0 & 0 & 0 \end{bmatrix} * U^T * \left( \begin{bmatrix} C \\ M \\ Y \\ K \end{bmatrix} - \begin{bmatrix} b_0 \\ b_1 \\ b_2 \\ b_3 \end{bmatrix} \right) \quad \text{Equation 22}$$

and further, after applying a coordinate translation in the destination space with a vector ($b_0,b_1,b_2,b_3$):

$$\begin{bmatrix} C' \\ M' \\ Y' \\ K' \end{bmatrix} = U * \begin{bmatrix} 1 & 0 & 0 & 0 \\ 0 & 1 & 0 & 0 \\ 0 & 0 & 1 & 0 \\ 0 & 0 & 0 & 0 \end{bmatrix} * U^T * \begin{bmatrix} C \\ M \\ Y \\ K' \end{bmatrix} \quad \text{Equation 23}$$

In summary, the Equation 23 expresses the following transformations in order (from right to left):

1) it linearly transforms a four dimensional destination vector (c,m,y,k) of a pixel in an image into a vector space having four orthonormal base vectors. The four base vectors correspond with the columns of the matrix U. Three of these base vectors have directions that correspond with the three principal components of the linear transformation from a three dimensional source to the four-dimensional destination space;

2) the fourth component transformed vector, corresponding to a fourth orthonormal base vector is set to zero, thereby effectively truncating the number of dimensions of the transformed vector from four to three;

3) it transforms the resulting four-dimensional vector back to a vector expressed in the canonical base vectors of the destination space to obtain an approximate four-dimensional destination vector (c',m',y',k').

The above three steps can be visualized by a projection of a destination vector (c,m,y) onto an approximate destination vector (c'm'y').

In the above description of the second embodiment, it is silently assumed that the coefficients of the matrix [A] that are used for tetrahedral interpolation are known. In a practical case, it is not known a priori to which tetrahedron the approximate source vector that corresponds with an approximate destination vector belongs and hence what coefficients of the matrix [U] (which depends on a matrix [A] that is specific for a tetrahedron) have to be used to calculate the approximate destination vector using Equation 23.

Referring to FIG. 4, it is not a priori known within which "facet" the approximate (c,m,y,) will be projected, and hence what set of coefficients is to be used for this projection.

According to a preferred embodiment, this problem is solved by using a brute force method. According to this method multiple approximate destination vectors (c'm'y'k') are calculated using coefficients [A] of all the tetrahedrons related to a given inverse look up table and only this approximate destination vector is preserved that yields the shortest Euclidean distance with regard to the original destination vector related to a pixel in the destination image.

Referring to FIG. 4, this corresponds to projecting a destination vector (c,m,y) onto all the planes defined by the triangles corresponding to the range of the transformation from source space (L,a) to destination space (C,M,Y) and preserving only the approximate destination vector (c'm'y') that yields the shortest distance D.

Abstraction

While the above first and second embodiment have been explained primarily in the context of a destination profile that maps a profile color connection space onto a CMYK colorant space, it should be clear to a person skilled in the art that the same invention can also be used for a wide range of other similar problems.

For example, the method can also be used for profiles that map a profile connection space to a colorant space including any number of any colorants. Specifically mentioned are colorant sets that include, besides cyan, magenta, yellow and black, also orange and green or blue inks. In that case the dimensionality of the destination space becomes 6 or 7, but the principles of the generalized matrix inversion can just as well be applied.

The method can be used on ICC color output profiles, but just as well on color links or color transformations in the processing of PostScript™ or PDF™ documents, as long as these profiles, links or transformations have a look up table.

The current invention can also be used in compensation with black point compensation. Black point compensation is a technique to map the black point in a source space onto a black point in destination space. In that case the destination profile on which black point compensation has been applied is treated as just another candidate destination profile.

The invention claimed is:

1. A method for transforming a vector in a destination color space of a pixel in a destination image into a vector in a profile connection space via a selected profile within a computer, the selected profile belonging to a set of candidate profiles, the method comprising:
    determining, with the computer, for a number of the candidate profiles in the set an aggregate distance function by:
        using the candidate profile for transforming the vector of at least one pixel in the destination image into an approximate vector in the destination color space;
        calculating a distance between the vector of the at least one pixel in the destination image and the transformed approximate vector; and
        including the distance in the aggregated distance function;
    selecting the candidate profile that yields a smallest aggregate distance function within the set; and
    transforming the vector of the at least one pixel in the destination image into a vector in the profile connection space using the selected candidate profile.

2. The method according to claim 1, wherein the number of the candidate profiles include an inverse look-up table that maps the profile connection space onto the destination color space.

3. The method according to claim 2, wherein the number of the candidate profiles further include a forward look-up table that maps the destination color space onto the profile connection space.

4. The method according to claim 3, further comprising the steps of:
    using the forward look-up table to transform the at least one pixel in the destination image into an approximate vector in the source space; and
    using the inverse look-up table to transform the approximate vector in the profile connection space into an approximate vector in the destination color space.

5. The method according to claim 2, wherein a dimensionality of the destination color space is larger than or equal to a dimensionality of the profile connection space, and the method further comprises the steps of:
    linearly transforming the vector of the at least one pixel in the destination image into an orthonormal base having base vectors, wherein the base vectors are parallel to the principal components of the linear transformation defined by the inverse look-up table;
    truncating the number of dimensions of the linearly transformed vector so that its dimensionality corresponds to the dimensionality of the profile connection space; and
    transforming the truncated vector back to the canonical base of the destination color space.

6. The method according to claim 5, wherein the destination color space comprises a cyan, magenta, yellow, and black colorant space.

7. The method according to claim 5, wherein the destination color space comprises a cyan, magenta, yellow, black, orange, and blue or green colorant space.

8. The method according to claim 1, wherein the destination color space comprises a cyan, magenta, yellow, and black colorant space.

9. The method according to claim 1, wherein the destination color space comprises a cyan, magenta, yellow, black, orange and blue or green colorant space.

* * * * *